United States Patent
Mahajan et al.

(10) Patent No.: US 10,452,553 B1
(45) Date of Patent: Oct. 22, 2019

(54) SYSTEMS AND METHODS FOR DISTRIBUTING CACHE SPACE

(71) Applicant: Veritas Technologies LLC, Mountain View, CA (US)

(72) Inventors: Ketan Mahajan, Pune (IN); Niranjan Pendharkar, Pune (IN); Mahesh Khatpe, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 15/784,679

(22) Filed: Oct. 16, 2017

(51) Int. Cl.
*G06F 12/12* (2016.01)
*G06F 3/06* (2006.01)
*G06F 12/0871* (2016.01)
*G06F 12/128* (2016.01)
*G06F 12/122* (2016.01)

(52) U.S. Cl.
CPC .......... *G06F 12/0871* (2013.01); *G06F 3/065* (2013.01); *G06F 3/0613* (2013.01); *G06F 3/0619* (2013.01); *G06F 3/0665* (2013.01); *G06F 12/122* (2013.01); *G06F 12/128* (2013.01); *G06F 2212/6042* (2013.01); *G06F 2212/621* (2013.01)

(58) Field of Classification Search
CPC .... G06F 3/0611; G06F 3/0629; G06F 3/0689; G06F 3/0679; G06F 3/0613; G06F 3/0619; G06F 3/0665; G06F 3/065; G06F 12/621; G06F 12/0871
USPC .................................................. 711/171, 119
See application file for complete search history.

(56) References Cited

U.S. PATENT DOCUMENTS

| | | | | |
|---|---|---|---|---|
| 9,037,800 | B2* | 5/2015 | Ellard | G06F 12/0246 711/118 |
| 9,354,989 | B1* | 5/2016 | Sehgal | G06F 11/00 |
| 10,254,970 | B1* | 4/2019 | Martin | G06F 3/0611 |
| 2015/0095348 | A1* | 4/2015 | Presta | G06Q 50/01 707/748 |
| 2017/0060753 | A1* | 3/2017 | Denz | G06F 12/0871 |
| 2017/0262191 | A1* | 9/2017 | Dewakar | G06F 3/0611 |
| 2018/0121102 | A1* | 5/2018 | Paulzagade | G06F 3/0611 |

OTHER PUBLICATIONS

Sudhakar Paulzagade, et al.; Systems and Methods for Apportioning Bandwidth in Storage Systems; U.S. Appl. No. 15/783,222, filed Oct. 13, 2017.

* cited by examiner

*Primary Examiner* — Pierre Miche Bataille
(74) *Attorney, Agent, or Firm* — FisherBroyles, LLP (57) ABSTRACT

The disclosed computer-implemented method for distributing cache space may include (i) identifying workloads that make input/output requests to a storage system that comprises a cache that stores a copy of data recently written to the storage system, (ii) calculating a proportion of the cache that is occupied by data written to the cache by a workload, (iii) determining that the proportion of the cache that is occupied by the data written to the cache by the workload is disproportionate, and (iv) limiting the volume of input/output requests from workload that will be accepted by the storage system in response to determining that the proportion of the cache that is occupied by the data written to the cache by the workload is disproportionate. Various other methods, systems, and computer-readable media are also disclosed.

16 Claims, 6 Drawing Sheets

SYSTEMS AND METHODS FOR DISTRIBUTING CACHE SPACE

BACKGROUND

Large amounts of digital data are generated and stored every day. Whether in the form of images and videos uploaded to a social media website, reports produced by analysis servers, or electronic communication, digital data is typically written to and read from some form of digital storage medium. Many different types of storage media exist, all with different performance characteristics. Hard drives may return sequential reads faster than random reads, while flash storage may read quickly but write slowly, and caches may return results almost instantaneously on a hit. In some storage systems, all data may be initially written to the cache before being copied over to slower storage media, allowing for high performance in situations where the possibility of minor data loss isn't catastrophic.

Unfortunately, traditional storage systems may be subject to the noisy neighbor problem, where a workload that writes a disproportionate amount of data to the storage system compared to other workloads also occupies a disproportionate amount of the cache. In some cases, the workload may write new data more quickly than the cache flushes old data, causing the cache to fill up over time with more and more data from the workload and preventing other workloads from writing data to the cache. Accordingly, the instant disclosure describes improved systems and methods for distributing cache space.

SUMMARY

As will be described in greater detail below, the instant disclosure describes various systems and methods for distributing cache space by limiting the volume of input/output (I/O) requests accepted from workloads that use a disproportionate amount of cache space.

In one example, a computer-implemented method for distributing cache space may include (i) identifying a group of workloads that make I/O requests to a storage system that includes a cache that stores a copy of data recently written to the storage system by the workloads, (ii) calculating a proportion of the cache that is occupied by data written to the cache by a workload within the workloads, (iii) determining that the proportion of the cache that is occupied by the data written to the cache by the workload is disproportionate, and (iv) limiting the volume of I/O requests from workload that will be accepted by the storage system in response to determining that the proportion of the cache that is occupied by the data written to the cache by the workload is disproportionate.

In some embodiments, calculating the proportion of the cache that is occupied by the data written to the cache by the workload may include examining data currently stored in the cache. Additionally or alternatively, calculating the proportion of the cache that is occupied by the data written to the cache by the workload may include monitoring a rate at which the workload writes data to the cache.

In some embodiments, limiting the volume of I/O requests from workload that will be accepted by the storage system may include reducing a number of credits granted to the workload, where credits granted to the workload regulate the volume of I/O requests that the storage system will accept from the workload within a predetermined time period. In some examples, reducing the number of credits granted to the workload may include granting the workload a number of credits based at least in part on the inverse of the proportion of cache space occupied by the data written to the cache by the workload. Additionally or alternatively, reducing the number of credits granted to the workload may include granting a number of credits to the workload based on a service level agreement for the workload and withholding an additional number of credits from the workload in response to determining that the proportion of the cache that is occupied by the data written to the cache by the workload is disproportionate.

In some examples, determining that the proportion of the cache that is occupied by the data written to the cache by the workload is disproportionate may include determining that the data written to the cache by the workload occupies more than a predetermined threshold for a proportion of cache space occupied by data written to the cache by a single workload. In some examples, limiting the volume of I/O requests from workload that will be accepted by the storage system may include limiting a rate at which the workload writes data to the cache to be no greater than a rate at which the cache flushes the data written by the workload from the cache.

In some examples, the computer-implemented method may further include preserving a quality of service for at least one additional workload within the workloads by limiting the volume of I/O requests from workload that will be accepted by the storage system. In one embodiment, the cache may include a write-back cache. In some examples, the computer-implemented method may further include rejecting an I/O request from the workload in response to determining that the workload has reached a limit for I/O requests to the storage system.

In one embodiment, a system for implementing the above-described method may include (i) an identification module, stored in memory, that identifies a group of workloads that make I/O requests to a storage system that includes a cache that stores a copy of data recently written to the storage system by the workloads, (ii) a calculation module, stored in memory, that calculates a proportion of the cache that is occupied by data written to the cache by a workload within the workloads, (iii) a determination module, stored in memory, that determines that the proportion of the cache that is occupied by the data written to the cache by the workload is disproportionate, (iv) a limit module, stored in memory, that limits the volume of I/O requests from workload that will be accepted by the storage system in response to determining that the proportion of the cache that is occupied by the data written to the cache by the workload is disproportionate, and (v) at least one physical processor configured to execute the identification module, the calculation module, the determination module, and the limit module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a group of workloads that make I/O requests to a storage system that includes a cache that stores a copy of data recently written to the storage system by the workloads, (ii) calculate a proportion of the cache that is occupied by data written to the cache by a workload within the workloads, (iii) determine that the proportion of the cache that is occupied by the data written to the cache by the workload is disproportionate, and (iv) limit the volume of I/O requests from workload that will be accepted by the storage system in response to determining that the proportion of the cache that is occupied by the data written to the cache by the workload is disproportionate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for distributing cache space. As will be explained in greater detail below, by throttling the volume of requests accepted from workloads that occupy disproportionate cache space, the various systems and methods described herein may prevent workloads from occupying an overwhelming amount of space in the cache to the point that quality of service for other workloads is degraded. Moreover, the systems and methods described herein may improve the functioning and/or performance of a storage system by increasing the efficiency with which cache space is distributed and/or maintaining quality of service for all workloads that write to the storage system. These systems and methods may also improve the field of digital storage by providing efficient cache space distribution to storage systems that support multiple workloads.

Figure 1:
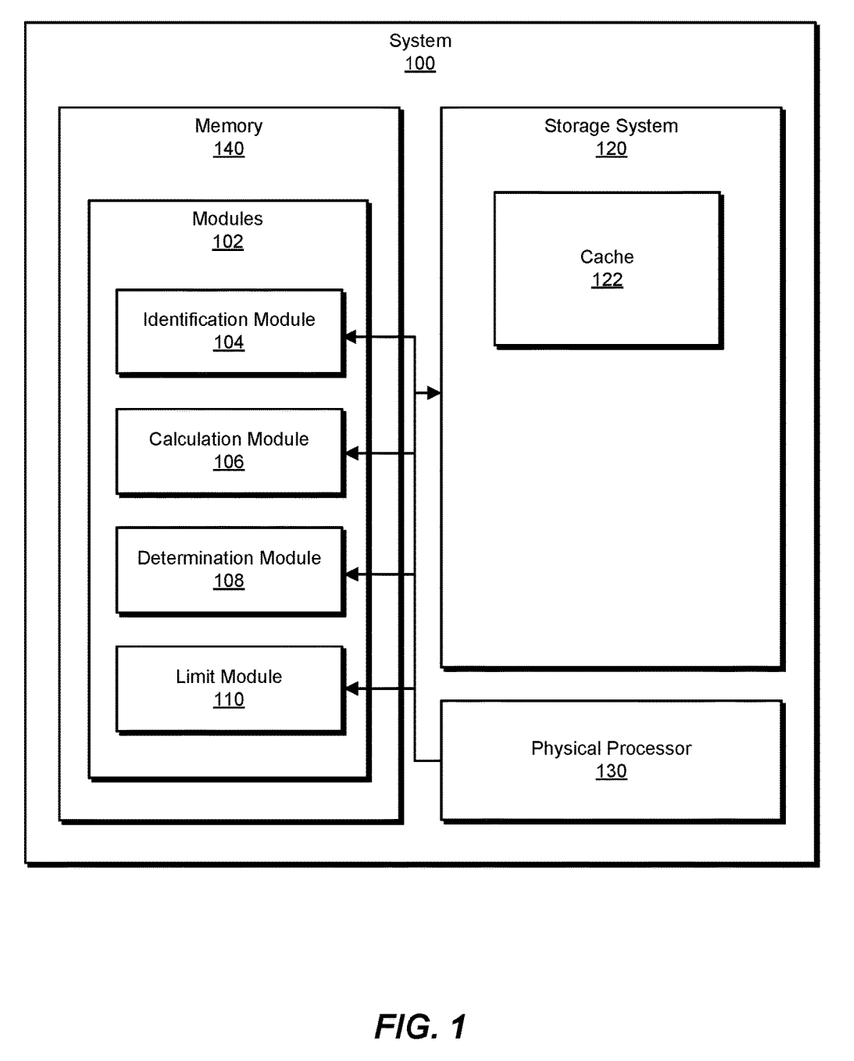
FIG. 1 is a block diagram of an example system for distributing cache space.
Figure 2:
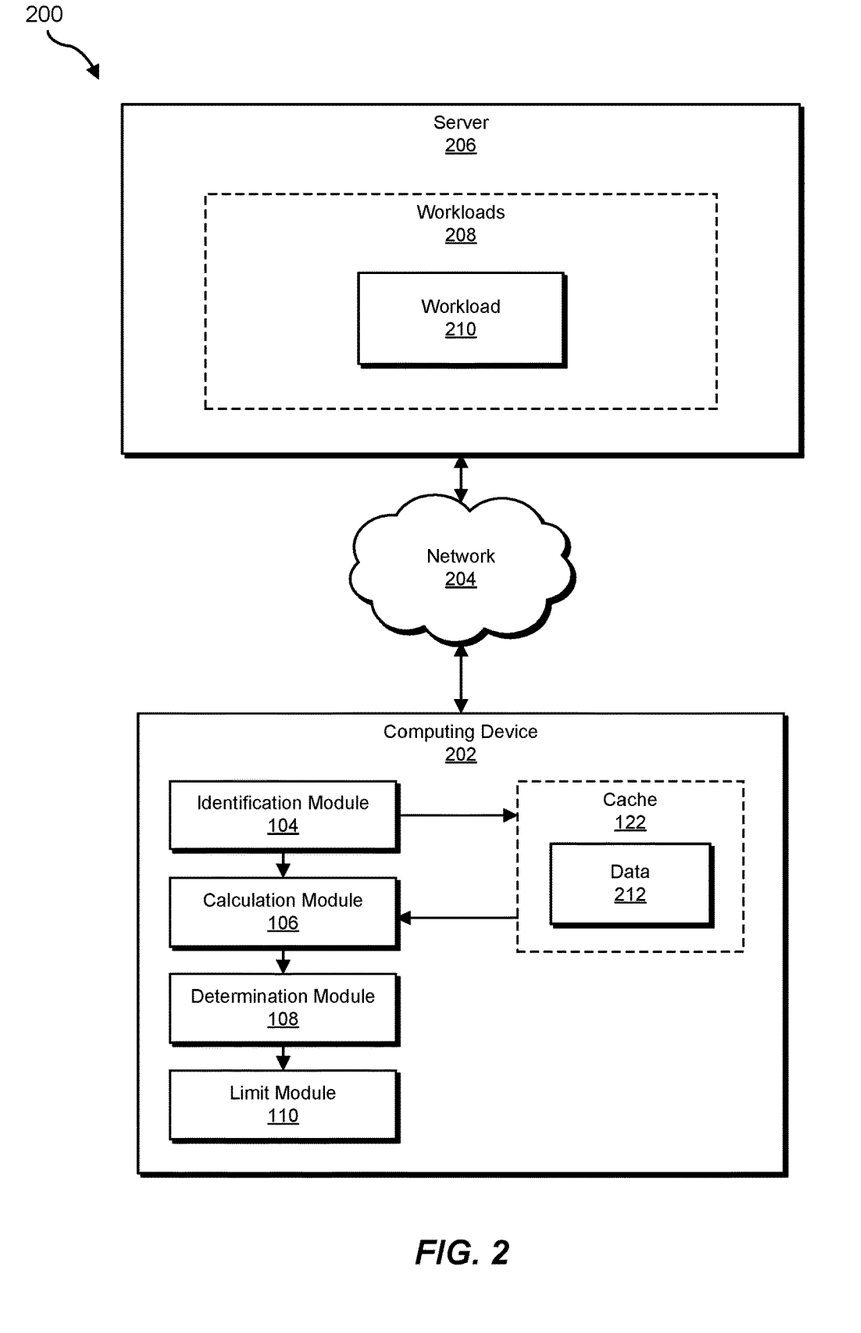
FIG. 2 is a block diagram of an additional example system for distributing cache space.
Figure 3:
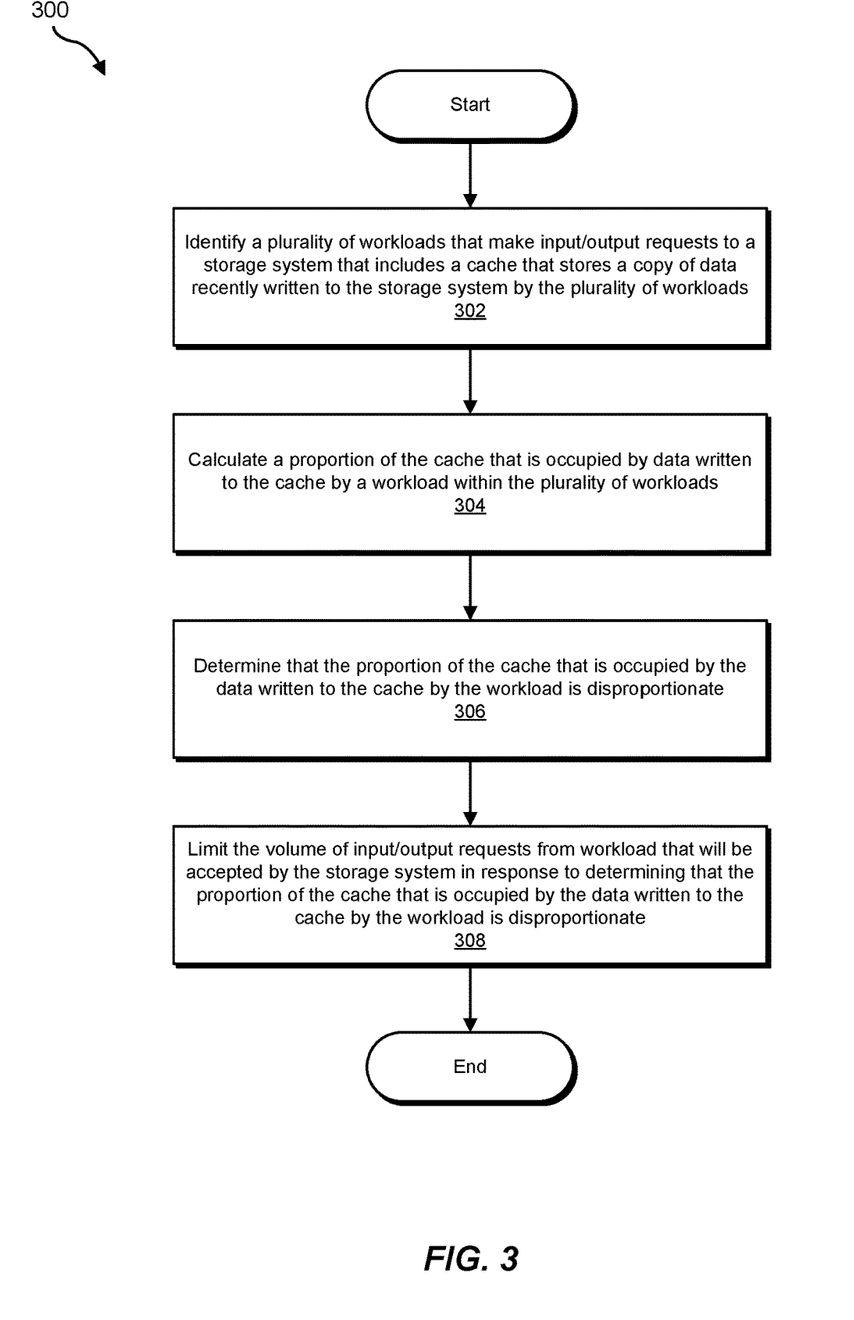
FIG. 3 is a flow diagram of an example method for distributing cache space.
Figure 4:
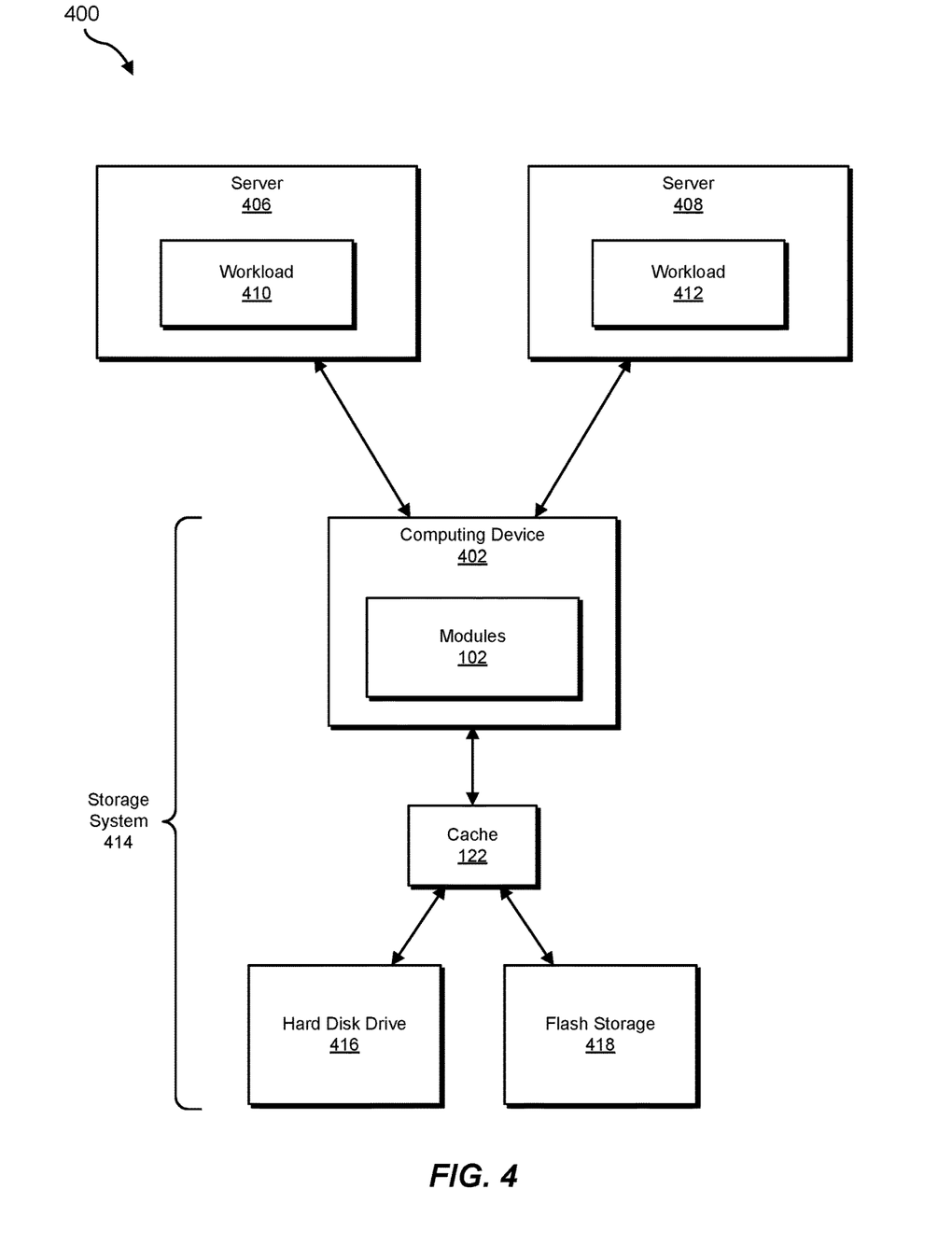
FIG. 4 is a block diagram of an example cache.

The following will provide, with reference to FIGS. 1, 2, and 4, detailed descriptions of example systems for distributing cache space. Detailed descriptions of corresponding computer-implemented methods will also be provided in connection with FIGS. 3 and 6. In addition, detailed descriptions of example cache occupancy will be provided in connection with FIG. 5.

FIG. 1 is a block diagram of example system 100 for distributing cache space. As illustrated in this figure, example system 100 may include one or more modules 102 for performing one or more tasks. For example, and as will be explained in greater detail below, example system 100 may include an identification module 104 that identifies a set of workloads that make I/O requests to a storage system that includes a cache that stores a copy of data recently written to the storage system by the plurality of workloads. Example system 100 may additionally include a calculation module 106 that calculates a proportion of the cache that is occupied by data written to the cache by a workload within the plurality of workloads. Example system 100 may also include a determination module 108 that determines that the proportion of the cache that is occupied by the data written to the cache by the workload is disproportionate. Example system 100 may additionally include a limit module 110 that limits the volume of I/O requests from workload that will be accepted by the storage system in response to determining that the proportion of the cache that is occupied by the data written to the cache by the workload is disproportionate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate distributing cache space. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more storage systems, such as storage system 120. Storage system 120 generally represents any type or form of group of one or more physical and/or virtual storage devices that store data for one or more workloads. Cache 122 generally represents any type or form of storage that stores data that has been recently written and/or read one or more workloads.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to distribute cache space.

Computing device 202 generally represents any type or form of computing device capable of reading computer-executable instructions. In one embodiment, computing device 202 may represent one or more servers. In some examples, computing device 202 may represent a group of connected servers in a remote data center (i.e., cloud servers). Additional examples of computing device 202 include, without limitation, laptops, tablets, desktops, servers of any type, variations or combinations of one or more of the same, or any other suitable computing device.

Server 206 generally represents any type or form of computing device that is capable of hosting one or more workloads. In some examples, server 206 may represent a group of connected servers in a remote data center (i.e., cloud servers). Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Workload 210 generally represents any type or form of computing task or tasks. Examples of workload 210 may include, without limitation, an application, a database, a script, a website, and/or a process. Workloads 208 generally represents any group of workloads that access the same storage system.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for distributing cache space. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a plurality of workloads that make I/O requests to a storage system that includes a cache that stores a copy of data recently written to the storage system by the plurality of workloads. For example, identification module 104 may, as part of computing device 202 in FIG. 2, identify workloads 208 that make I/O requests to a storage system that includes cache 122 that stores a copy of data 212 recently written to the storage system by workloads 208.

The term "storage system," as used herein, generally refers to any group of storage media that share a limited amount of bandwidth to fulfill I/O requests. The term "storage medium," as used herein, generally refers to any device and/or component of a device configured to store electronic data in physical and/or virtual memory. In some examples, a storage medium may be designed to store large amounts of data, write data efficiently to memory, and/or retrieve data efficiently from memory. Examples of storage media may include, without limitation, flash drives, solid state drives, hard disk drives, random access memory, and/or caches. In some examples, a storage medium may be configured to perform one or more operations on data before storing the data. For example, a storage medium may be configured to perform a deduplication operation (i.e., only store data that is not already stored) a compression operation, and/or an encryption operation. In some embodiments, a storage system may include one or more modules that manage the storage media within the storage system, such as modules that monitor and/or adjust space within a cache used by various workloads.

The term "workload," as used herein, generally refers to any script, process, application, code, and/or software configured to perform at least one computing task. In some embodiments, a workload may include a virtual machine and/or be hosted within a virtual machine and/or container. In some examples, a workload may be hosted on a remote server. In one example, multiple workloads that access the same storage system may be hosted on the same server. In other examples, multiple workloads that access the same storage system may be hosted on different servers. In some examples, the term "workload" may refer to a job, task, and/or application hosted by and/or executed within a virtual data center. For example, a virtual data center may provision a workload with one or more virtualized resources (including, e.g., storage bandwidth).

The term "I/O request," or "request," as used herein, generally refers to any electronic message that contains data to be written and/or a request for data to be read. In some examples, an I/O request may be a read request. In other examples, an I/O request may be a write request. In some examples, an I/O request may be directed at a specific storage medium within a group of storage media. For example, an I/O request may be directed at a cache.

The term "cache," as used herein, generally refers to any storage medium that stores data recently written to and/or read by a workload. In some embodiments, a cache may store data to static random access memory. In some embodiments, a cache may store a copy of data written to and/or read from another storage medium. In one embodiment, a cache may be a write-back cache. In some examples, a write-back cache may store an up-to-date copy of data recently written by one or more workloads that has not yet been stored in any other storage medium. In these examples, a storage system may initially store data written by workloads in the cache and may periodically update other storage media with the data. In one embodiment, a write-back cache may propagate data written to the cache to another storage medium when the data in the cache is about to be flushed and/or overwritten. In some examples, workloads may only write data directly to the cache, not to other storage media in a storage system. In these examples, workloads that are prevented from utilizing space in the cache (e.g., because another workload is overutilizing cache space) may suffer from limited ability to write data to the storage system.

Identification module 104 may identify the workloads and/or storage system in a variety of contexts. For example, as illustrated in FIG. 4, identification module 104 may, as part of modules 102 on a computing device 402, identify a workload 410 and/or a workload 412 hosted on a server 406 and/or a server 408, respectively. In other examples, identification module 104 may identify multiple workloads hosted on the same server. In some examples, workloads 410 and/or 412 may write data to a storage system 414 that includes cache 122, a hard disk drive 416, and/or flash storage 418. In some embodiments, workloads 410 and/or 412 may write data to cache 122 that is periodically copied to hard disk drive 416 and/or flash storage 418. In some examples, server 406, server 408, computing device 402, hard disk drive 416, and/or flash storage 418 may all be located in the same physical data center. In other embodiments, server 406, server 408, computing device 402, hard disk drive 416, and/or flash storage 418 may be located in multiple remote data centers (i.e., the cloud). In one embodiment, multiple elements of storage system 414 may all be hosted on computing device 402. In other embodiments, each element of storage system 414 may be part of a different physical and/or virtual computing device.

Returning to FIG. 3, at step 304, one or more of the systems described herein may calculate a proportion of the cache that is occupied by data written to the cache by a workload within the plurality of workloads. For example, calculation module 106 may, as part of computing device 202 in FIG. 2, calculate a proportion of cache 122 that is occupied by data written to cache 122 by workload 210 within workloads 208.

Calculation module 106 may calculate the proportion of a cache that is occupied by data from a particular workload in a variety of ways and/or contexts. For example, calculation module 106 may periodically calculate the proportion of the cache that is occupied by data written by each workload that writes data to a storage system. In one embodiment, calculation module 106 may calculate the proportion of the cache occupied by data from various workloads every epoch (i.e., every second). In some embodiments, calculation module 106 may calculate cache occupancy at the beginning and/or end of a predetermined time period during which the storage system will accept a limited number of I/O requests from each workload.

In some examples, calculation module 106 may calculate the proportion of the cache that is occupied by the data written to the cache by the workload by examining data currently stored in the cache. For example, calculating module 106 may examine data currently stored in the cache to determine which workload wrote each portion of data currently stored in the cache.

Additionally or alternatively, calculation module 106 may calculate the proportion of the cache that is occupied by the data written to the cache by the workload by monitoring a rate at which the workload writes data to the cache. For example, if one workload writes twice as much data to the cache as another workload, calculation module 106 may determine that the first workload occupies a greater proportion of space in the cache than the second workload.

At step 306, one or more of the systems described herein may determine that the proportion of the cache that is occupied by the data written to the cache by the workload is disproportionate. For example, determination module 108 may, as part of computing device 202 in FIG. 2, determine that the proportion of cache 122 that is occupied by data written to cache 122 by workload 210 is disproportionate.

Determination module 108 may determine that the proportion of the cache occupied by data written by a particular workload is disproportionate in a variety of ways. For example, determination module 108 may determine that the proportion of the cache that is occupied by the data written to the cache by the workload is disproportionate by determining that the data written to the cache by the workload occupies more than a predetermined threshold for a proportion of cache space occupied by data written to the cache by a single workload. For example, the proportion of the cache occupied by data written by a particular workload may be more than a predetermined threshold of 10%, 20%, or 50%. In some examples, the predetermined threshold may be calculated based on the number of workloads that write to the storage system. For example, if five workloads write to a storage system, the predetermined threshold may be one fifth. In other examples, the predetermined threshold may be calculated based on a service level agreement for the workload. For example, a workload may have a service level agreement that entitles the workload to occupy a minimum of 5% of the cache and/or a maximum of 30% of the cache. Additionally or alternatively, the predetermined threshold may be calculated based on the size of the workload, the volume of requests made by the workload, and/or the volume of bandwidth to which the workload is entitled. In some examples, different workloads may have different predetermined thresholds. In some embodiments, determination module 108 may determine that the workload occupies a disproportionate amount of space in the cache by determining that the workload writes new data to the cache at a higher rate than the cache flushes old data.

Figure 5:
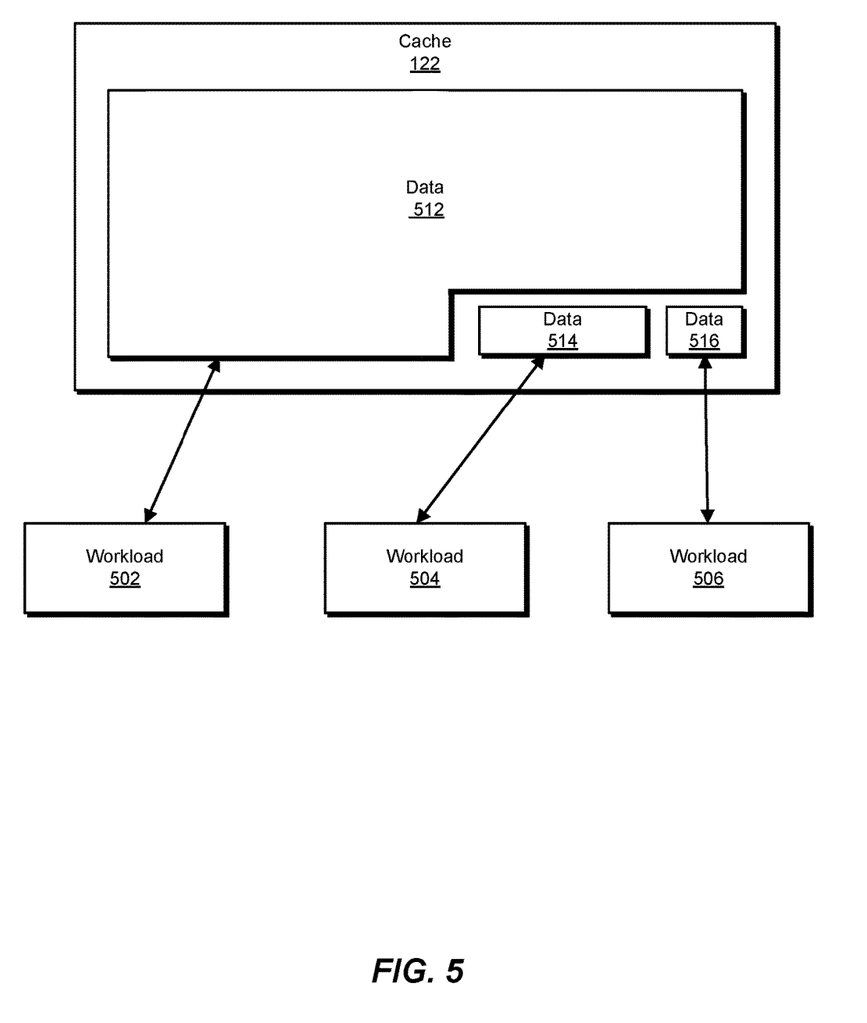
FIG. 5 is a block diagram of an example computing system for distributing cache space.

In some examples, a workload may take up such a disproportionate amount of cache space that very little space is left for other workloads. For example, as illustrated in FIG. 5, workloads 502, 504, and/or 506 may write data 512, 514, and/or 516, respectively, to cache 122. In this example, workload 502 may occupy so much of cache 122 with data 512 that workloads 504 and/or 506 have very little cache space into which to write data 514 and/or 516. In other examples, a single workload may occupy the entirety of the cache, leaving no room for data written by other workloads. In some embodiments, determination module 108 may determine that a workload is taking up a disproportionate amount of space compared to the total amount of space taken up by all other workloads that write data to the cache.

Returning to FIG. 3, at step 308, one or more of the systems described herein may limit the volume of I/O requests from workload that will be accepted by the storage system in response to determining that the proportion of the cache that is occupied by the data written to the cache by the workload is disproportionate. For example, limit module 110 may, as part of computing device 202 in FIG. 2, limit the volume of I/O requests from workload 210 that will be accepted by the storage system in response to determining that the proportion of cache 122 that is occupied by data written to cache 122 by workload 210 is disproportionate.

Limit module 110 may limit the volume of I/O requests from the workload in a variety of ways. In some embodiments, the storage system may use credits to regulate the volume of I/O requests accepted from workloads during a given time period and limit module 110 may limit the volume of I/O requests from workload that will be accepted by the storage system by reducing a number of credits granted to the workload.

The term "credit," as used herein, generally refers to any variable, object, file, and/or other method for tracking the volume of requests from a workload accepted by a storage system during a predetermined time period. In some embodiments, the systems described herein may calculate the total number of credits available to all workloads that make requests of a storage system during a time period by dividing the total bandwidth available for the storage system by the average bandwidth consumed by I/O requests to the storage system during a previous predetermined time period. In some examples, workloads may receive different numbers of credits for each time period based on the size of the workloads, the priority assigned to each workload by an administrator, and/or other factors. In some embodiments, credits may be represented as integer values. In various embodiments, the systems described herein may assign and/or deduct portions of credits.

Figure 6:
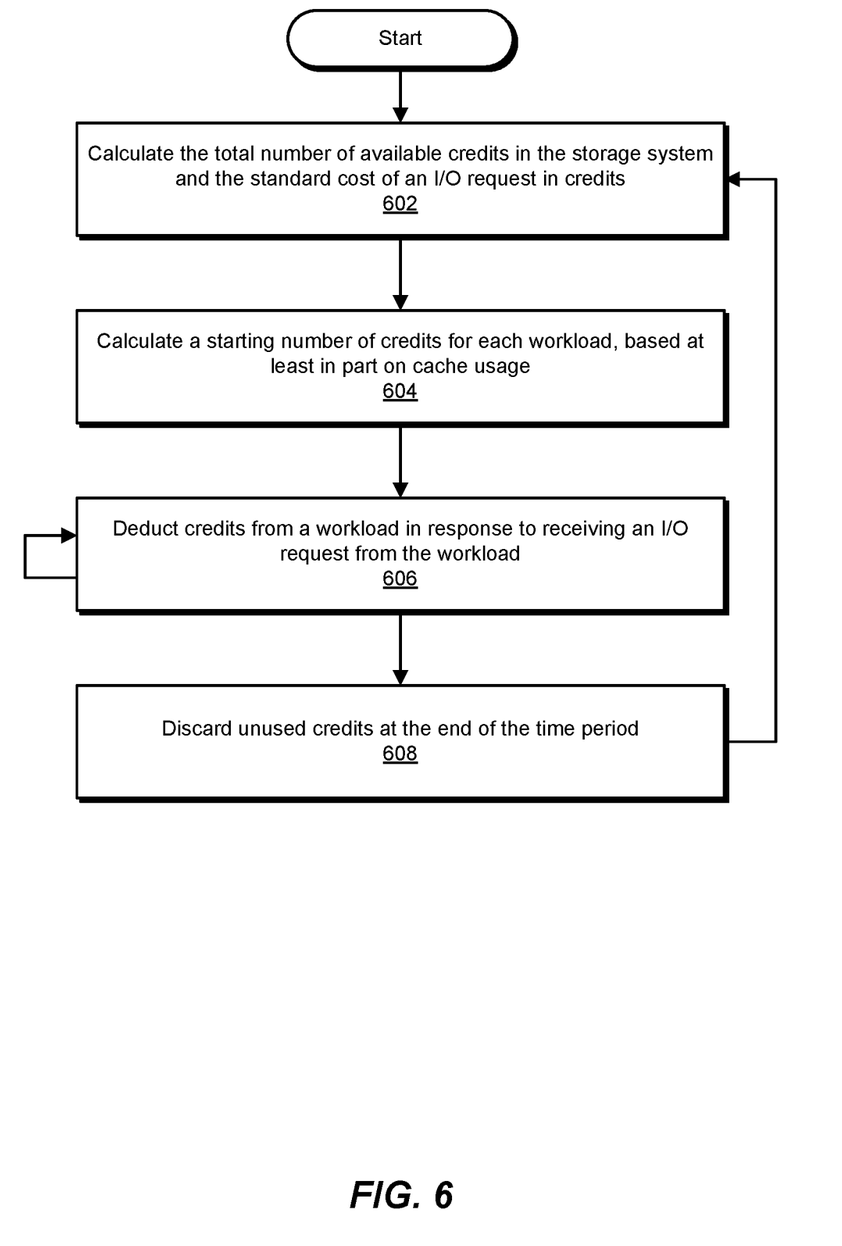
FIG. 6 is a flow diagram of an example method for distributing cache space.

For example, as illustrated in FIG. 6, at step 602 the systems described herein may calculate the total number of available credits in a storage system and/or the standard cost of an I/O request in credits. In one example, a storage system may have the bandwidth to fulfill 1,000 requests during a predetermined time period of one second and may calculate that 1,000 credits are available and each request costs one credit. At step 604, the systems described herein may calculate a starting number of credits for each workload, based at least in part on cache usage. In some examples, workloads that have a service level agreement that specifies a certain quality of service may receive more credits than workloads that have a service level agreement that specifies a lower minimum quality of service. In some examples, workloads may receive additional credits if available credits remain after each workload has received enough credits to guarantee the minimum quality of service specified in the service level agreement for that workload. In one embodiment, limit module 110 may withhold some or all of these additional credits from any workload that occupies a disproportionate amount of space in the cache.

At step 606, the systems described herein may deduct credits from a workload in response to receiving an I/O request from the workload. In some examples, a workload may continue to make requests until the workload runs out of credits or the time period ends, whichever happens first. At step 608, the systems described herein may discard unused credits and the cycle may restart.

In some examples, limit module 110 may calculate the number of credits granted to the workload for each time period by granting the workload a number of credits based at least in part on the inverse of the proportion of cache space occupied by the data written to the cache by the workload. For example, if a workload occupies 90% of the cache, limit module 110 may grant the workload only 10% of the additional credits that the workload would normally be granted after service level agreement minimums are met.

In some embodiments, systems described herein may reject an I/O request from the workload in response to determining that the workload has reached a limit for I/O requests to the storage system. For example, the systems described herein may reject an I/O request from the workload after determining that the workload does not have sufficient available credits to pay for the request. In other embodiments, the workload may cease making requests after exhausting all of the available credits for the time period.

In some embodiments, systems described herein may preserve quality of service for at least one additional workload within the group of workloads by limiting the volume of I/O requests from workload that will be accepted by the storage system. In some examples, by limiting the volume of I/O requests from the workload, the systems described herein may limit the volume of data the workload is able to write to the cache during any given time period, enabling other workloads to have greater access to the cache.

In some examples, limit module 110 may limit the volume of I/O requests from workload that will be accepted by the storage system by limiting a rate at which the workload writes data to the cache to be no greater than a rate at which the cache flushes the data written by the workload from the cache. By limiting the write rate of the workload to the flush rate of the cache or slower, the systems described herein may prevent the workload from writing data to the cache more quickly than the data is flushed and consequently filling up the cache with an increasing volume of data over time.

In some examples, the systems described herein may provide equitable cache distribution between workloads that perform a high percentage of write operations and workloads that perform a lower percentage of write operations. For example, if one workload performs write operations 100% of the time and another workload that accesses the same storage system performs write operations 30% of the time and read operations 70% of the time, the first workload may initially write more than three times as much data to the cache as the second workload. If the flush rate is the same for both workloads, the second workload may eventually be left with negligible space in the cache. In this example, the systems described herein may distribute credits between the two workloads in the inverse of their write rates, apportioning 100 credits to the second workload for every 30 credits apportioned to the first workload. In this example, the two workloads may then write to the cache at similar rates and the second workload may use the remaining credits to perform additional read requests.

As explained in connection with method 300 above, the systems and methods described herein may dynamically control the cache utilization for workloads with regard to the read-write ratios for the workloads without a user having to manually specify the bandwidth and/or cache space allocated to each workload. In some embodiments, the systems and methods described herein may be agnostic to workload characteristics, functioning equally well for workloads that perform mostly write operations, mostly read operations, or a balance of both. In some examples, the systems described herein may be effective even when the flush rate is different for different workloads and/or may avoid calculating flush rates, due to the systems described herein using measurements that do not rely on flush rate to determine which workloads to throttle. In addition, the systems and methods described herein may quickly adapt to changing workload characteristics and/or behavior without requiring manual intervention.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for distributing cache space, at least a portion of the method being performed by a computing device comprising at least one processor, the method comprising:
    identifying a plurality of workloads that make input/output requests to a storage system that comprises a cache that stores a copy of data recently written to the storage system by the plurality of workloads;
    calculating a proportion of the cache that is occupied by data written to the cache by a workload within the plurality of workloads, wherein calculating the proportion of the cache that is occupied by the data written to the cache by the workload comprises examining data currently stored in the cache to determine which workload within the plurality of workloads wrote each portion of data currently stored in the cache and monitoring a rate at which the workload writes data to the cache;
    determining that the proportion of the cache that is occupied by the data written to the cache by the workload is disproportionate; and
    limiting the volume of input/output requests from workload that will be accepted by the storage system in response to determining that the proportion of the cache that is occupied by the data written to the cache by the workload is disproportionate.

2. The computer-implemented method of claim 1, wherein determining that the proportion of the cache that is occupied by the data written to the cache by the workload is disproportionate comprises determining that the data written to the cache by the workload occupies more than a predetermined threshold for a proportion of cache space occupied by data written to the cache by a single workload.

3. The computer-implemented method of claim 1, wherein limiting the volume of input/output requests from workload that will be accepted by the storage system comprises reducing a number of credits granted to the workload, wherein credits granted to the workload regulate the volume of input/output requests that the storage system will accept from the workload within a predetermined time period.

4. The computer-implemented method of claim 3, wherein reducing the number of credits granted to the workload comprises granting the workload a number of credits based at least in part on the inverse of the proportion of cache space occupied by the data written to the cache by the workload.

5. The computer-implemented method of claim 3, wherein reducing the number of credits granted to the workload comprises:
    granting a number of credits to the workload based on a service level agreement for the workload; and
    withholding an additional number of credits from the workload in response to determining that the proportion of the cache that is occupied by the data written to the cache by the workload is disproportionate.

6. The computer-implemented method of claim 1, wherein limiting the volume of input/output requests from workload that will be accepted by the storage system comprises limiting the rate at which the workload writes data to the cache to be no greater than a rate at which the cache flushes the data written by the workload from the cache.

7. The computer-implemented method of claim 1, further comprising preserving a quality of service for at least one additional workload within the plurality of workloads by limiting the volume of input/output requests from workload that will be accepted by the storage system.

8. The computer-implemented method of claim 1, wherein the cache comprises a write-back cache.

9. The computer-implemented method of claim 1, further comprising rejecting an input/output request from the workload in response to determining that the workload has reached a limit for input/output requests to the storage system.

10. A system for distributing cache space, the system comprising:
    an identification module, stored in memory, that identifies a plurality of workloads that make input/output requests to a storage system that comprises a cache that stores a copy of data recently written to the storage system by the plurality of workloads;
    a calculation module, stored in memory, that calculates a proportion of the cache that is occupied by data written to the cache by a workload within the plurality of workloads, wherein calculating the proportion of the cache that is occupied by the data written to the cache by the workload comprises examining data currently stored in the cache to determine which workload within the plurality of workloads wrote each portion of data currently stored in the cache and monitoring a rate at which the workload writes data to the cache;
    a determination module, stored in memory, that determines that the proportion of the cache that is occupied by the data written to the cache by the workload is disproportionate;
    a limit module, stored in memory, that limits the volume of input/output requests from workload that will be accepted by the storage system in response to determining that the proportion of the cache that is occupied by the data written to the cache by the workload is disproportionate; and
    at least one physical processor configured to execute the identification module, the calculation module, the determination module, and the limit module.

11. The system of claim 10, wherein the determination module determines that the proportion of the cache that is occupied by the data written to the cache by the workload is disproportionate by determining that the data written to the cache by the workload occupies more than a predetermined threshold for a proportion of cache space occupied by data written to the cache by a single workload.

12. The system of claim 10, wherein the limit module limits the volume of input/output requests from workload that will be accepted by the storage system by reducing a number of credits granted to the workload, wherein credits granted to the workload regulate the volume of input/output requests that the storage system will accept from the workload within a predetermined time period.

13. The system of claim 12, wherein the limit module reduces the number of credits granted to the workload by granting the workload a number of credits based at least in part on the inverse of the proportion of cache space occupied by the data written to the cache by the workload.

14. The system of claim 12, wherein the limit module reduces the number of credits granted to the workload by:
    granting a number of credits to the workload based on a service level agreement for the workload; and
    withholding an additional number of credits from the workload in response to determining that the proportion of the cache that is occupied by the data written to the cache by the workload is disproportionate.

15. The system of claim 10, wherein the limit module limits the volume of input/output requests from workload that will be accepted by the storage system by limiting the rate at which the workload writes data to the cache to be no greater than a rate at which the cache flushes the data written by the workload from the cache.

16. A non-transitory computer-readable medium comprising one or more computer-readable instructions that, when executed by at least one processor of a computing device, cause the computing device to:
identify a plurality of workloads that make input/output requests to a storage system that comprises a cache that stores a copy of data recently written to the storage system by the plurality of workloads;
calculate a proportion of the cache that is occupied by data written to the cache by a workload within the plurality of workloads, wherein calculating the proportion of the cache that is occupied by the data written to the cache by the workload comprises examining data currently stored in the cache to determine which workload within the plurality of workloads wrote each portion of data currently stored in the cache and monitoring a rate at which the workload writes data to the cache;
determine that the proportion of the cache that is occupied by the data written to the cache by the workload is disproportionate; and
limit the volume of input/output requests from workload that will be accepted by the storage system in response to determining that the proportion of the cache that is occupied by the data written to the cache by the workload is disproportionate.

\* \* \* \* \*